United States Patent
Yang et al.

(10) Patent No.: US 11,820,903 B2
(45) Date of Patent: Nov. 21, 2023

(54) PHOTO-CURABLE ELASTIC INK COMPOSITION FOR THREE-DIMENSIONAL PRINTING

(71) Applicant: ZHUHAI SEINE TECHNOLOGY CO., LTD., Zhuhai (CN)

(72) Inventors: Qiancheng Yang, Zhuhai (CN); Jia Li, Zhuhai (CN); Likun Wang, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 14 days.

(21) Appl. No.: 17/378,246

(22) Filed: Jul. 16, 2021

(65) Prior Publication Data
US 2021/0340393 A1 Nov. 4, 2021

Related U.S. Application Data

(63) Continuation-in-part of application No. 16/255,367, filed on Jan. 23, 2019, now Pat. No. 11,098,210, which is a continuation of application No. PCT/CN2017/085099, filed on May 19, 2017.

(30) Foreign Application Priority Data

Sep. 5, 2016 (CN) .......................... 201610806994.5

(51) Int. Cl.
| | |
|---|---|
| C09D 11/10 | (2014.01) |
| C09D 11/101 | (2014.01) |
| B33Y 70/00 | (2020.01) |
| C08F 2/50 | (2006.01) |
| C09D 11/107 | (2014.01) |
| C09D 11/037 | (2014.01) |

(52) U.S. Cl.
CPC ............ *C09D 11/101* (2013.01); *B33Y 70/00* (2014.12); *C08F 2/50* (2013.01); *C09D 11/037* (2013.01); *C09D 11/107* (2013.01)

(58) Field of Classification Search
CPC ..... C09D 11/38; C09D 11/322; C09D 11/107; C09D 11/101; C09D 11/037; C08F 2/48; C08F 2/50; B33Y 70/00
USPC .................... 522/99, 134, 172, 148
See application file for complete search history.

(56) References Cited

U.S. PATENT DOCUMENTS

| | | |
|---|---|---|
| 2009/0155484 A1 | 6/2009 | Hayata et al. |
| 2011/0028586 A1* | 2/2011 | Kito .................. C09D 11/101 522/63 |

FOREIGN PATENT DOCUMENTS

| | | |
|---|---|---|
| CN | 1884401 A | 12/2006 |
| CN | 101624492 A | 1/2010 |
| CN | 102226049 A | 10/2011 |
| CN | 103052695 A | 4/2013 |
| CN | 104066803 A | 9/2014 |
| CN | 104837920 A | 8/2015 |
| CN | 105131581 A | 12/2015 |
| CN | 105164210 A | 12/2015 |
| JP | 2016113518 A | 6/2016 |

OTHER PUBLICATIONS

Ethylene glycol phenyl ether acrylate safety data sheet from Sigma-Aldrich. online. Retrieved online [Mar. 9, 2023]. Retrieved from URL:<https://www.sigmaaldrich.com/US/en/search/48145-04-6?focus=products&page=1&perpage=30&sort=relevance&term=48145-04-6&type=cas_number> (Year: 2023).*
Glass Transition Polymers from Polymerdatabase.com [online]. Retrieved online on [Mar. 3, 2023]. Retrieved from URL:<https://polymerdatabase.com/polymer%20physics/Polymer%20Tg.html> (Year: 2023).*
TCI Product Description: CAS RN: 56641-05-5 | Product No. P2871: Phenoxypolyethylene Glycol Acrylate (n=approx. 2). [online], [Retrieved on Jun. 7, 2023]. Retrieved from the interner<URL:https://www.tcichemicals.com/DE/en/p/P2871>. (Year: 2023).*
Safety Data for 2-Phenoxyethyl Acrylate. [ Retrieved online] Retrieved Dec. 8, 2023. Retrieved from <URL: https://www.chemicalbook.com/ChemicalProductProperty_EN_CB1113666.htm>> (Year: 2023).*
NK Ester Series Compounds: NK Ester AMP10G (Phenoxy Ethyl Acrylate ( EO 1mol)). [Retrieved online]. Retrieved on Dec. 8, 2023. Retrieved online <URL:http://www.dycl.co.kr/lcd/nk_ester.html>. (Year: 2023).*

* cited by examiner

*Primary Examiner* — Sanza L. McClendon
(74) *Attorney, Agent, or Firm* — ANOVA LAW GROUP, PLLC

(57) ABSTRACT

The present disclosure provides a photo-curable elastic ink composition for three-dimensional printing and the preparation method. The ink composition includes approximately 10%-75% of a soft monomer, approximately 10%-75% of a hard monomer, approximately 5%-20% of a cross-linking agent, approximately 5%-20% of a non-reactive soft resin, approximately 0.5%-10% of a photo-initiator, approximately 0%-0.5% of a colorant, and approximately 0.05%-8% of an auxiliary agent. The soft monomer is capable of generating a homopolymer with a glass transition temperature lower than about 25° C. The hard monomer is capable of generating a homopolymer with a glass transition temperature of about 25° C. or higher. The non-reactive soft resin is a resin without containing any radiation curable group in the molecular structure and having a glass transition temperature less than 0° C.

16 Claims, No Drawings

PHOTO-CURABLE ELASTIC INK COMPOSITION FOR THREE-DIMENSIONAL PRINTING

This application is a continuation-in-part application of U.S. patent application Ser. No. 16/255,367, filed on Jan. 23, 2019, which is a continuation application of International Application No. PCT/CN2017/085099, filed on May 19, 2017, which claims the priority and benefits of Chinese Patent Application Serial No. CN201610806994.5, filed with the State Intellectual Property Office of P. R. China on Sep. 5, 2016, the entire content of all of which is incorporated herein by reference.

FIELD OF THE DISCLOSURE

The present disclosure relates to the field of printing technology and, more particularly, relates to a photo-curable elastic ink composition for three-dimensional (3D) printing and a preparation method thereof.

BACKGROUND

Elastic material refers to a polymer material that an object made of which deforms significantly under a weak stress, and can also quickly recover to nearly the original state and size when the stress is released. The preparation of conventional elastic materials requires high-temperature vulcanization, so it is not allowed to be co-formed with heat-sensitive components. In addition, the vulcanization processing time is long, and usually takes tens of minutes to several hours, which is lack of possibility for efficient, continuous production.

With the continuous advancement of science and technology, photo-curable elastic materials have been gradually developed. Photo-curable elastic materials can realize rapid solidification of elastic materials by using photo-curing technology, such that elastic objects can be rapidly produced under mild conditions. At present, the photo-curable elastic materials are mainly classified into blended photo-curable elastic materials and chemically modified polymerizable elastic material according to different preparation methods. Among them, the preparation method of the blended photo-curable elastic materials usually includes dissolving a conventional elastic material in a solvent and mixing with a photo-curable monomer and a resin. By adjusting the proportion of the components, a photo-curable elastic material with a low viscosity, a fast curing speed, high transparency, and excellent elastic performance can be obtained. However, the photo-curable elastic material obtained by the method contains a solvent, and the solvent is easily volatilized when the temperature is raised, so it is not suitable for the field of 3D printing. The preparation method for chemically modified polymerizable elastic materials is generally chemically modifying a conventional elastic material to introduce a photosensitive acrylate group or an epoxy group in the molecular structure of the conventional elastic material. Therefore, the produced photo-curable elastic material may have photosensitivity and relatively high elasticity. However, it may also show a high viscosity, poor compatibility with acrylate resin or monomer, and low transparency, and thus it may not be suitable for 3D printing.

BRIEF SUMMARY OF THE DISCLOSURE

One aspect of the present disclosure provides a photo-curable elastic ink composition for 3D printing. The ink composition includes the following components in a weight percentage: approximately 10%-75% of a soft monomer; approximately 10%-75% of a hard monomer; approximately 5%-20% of a cross-linking agent; approximately 5%-20% of a non-reactive soft resin, approximately 0.5%-10% of a photo-initiator; 0% to approximately 0.5% of a colorant; and approximately 0.05%-8% of an auxiliary agent. The soft monomer is a monomer capable of forming a homopolymer having a glass transition temperature lower than about 25° C. The hard monomer is a monomer capable of forming a homopolymer having a glass transition temperature higher than or equal to about 25° C. The non-reactive soft resin is a resin having a glass transition temperature less than about 0° C. and a molecular structure without containing any radiation curable group.

Another aspect of the present disclosure provides preparation method for the photo-curable elastic ink composition for 3D printing according to the present disclosure. The method includes mixing the soft monomer, the hard monomer, the cross-linking agent, the non-reactive soft resin, the colorant, and the auxiliary agent together to obtain a first mixture; adding the photo-initiator into the first mixture to obtain a second mixture after the photo-initiator is completely dissolved; and filtering the second mixture and collecting the filtrate to obtain the photo-curable elastic ink composition.

Other aspects of the present disclosure can be understood by those skilled in the art in light of the description, the claims, and the drawings of the present disclosure.

DETAILED DESCRIPTION

A photo-curable elastic material used for 3D printing is required to demonstrate characteristics, such as photosensitivity, fast curing speed, excellent elastic performance, small or substantially no shrinkage, etc. When used for 3D inkjet printing, the photo-curable elastic material is further required to have a low viscosity, such that when performing inkjet printing, the printing process may be smooth, the nozzle may not be easily blocked, and excessive heating of the elastic material prior to the inkjet printing may not be required. Energy may be saved and, in the meantime, the life of the print head may be extended.

The present disclosure provides a photo-curable elastic ink composition for 3D printing and a preparation method for the photo-curable elastic ink composition. The 3D objects printed by the photo-curable elastic ink composition according to the present disclosure demonstrate excellent elastic performance, with low shrinkage rate of the 3D objects. The ink composition demonstrates desired photosensitivity and fast photo-curing speed during a layer-by-layer printing process. Moreover, the present disclosure can also provide photo-curable elastic ink compositions with different viscosities.

The present disclosure provides a photo-curable elastic ink composition for 3D printing, including the following components in a weight percentage: approximately 10%-75% of a soft monomer, approximately 10%-75% of a hard monomer, approximately 5%-20% of a cross-linking agent, approximately 5%-20% of a non-reactive soft resin, approximately 0.5%-10% of a photo-initiator, 0 to approximately 0.5% of a colorant, and approximately 0.05%-8% of an auxiliary agent. Among them, the soft monomer refers to a monomer capable of forming a homopolymer having a glass transition temperature lower than about 25° C.; the hard monomer refers to a monomer capable of forming a homopolymer having a glass transition temperature equal to or higher than about 25° C.; the non-reactive soft resin refers to a resin having a molecular structure without radiation curable groups and also having a glass transition temperature less than about 0° C.

The photo-curable elastic ink composition for 3D printing according to the present disclosure may also be referred to as a photo-curable elastic material, and the 3D object printed using the photo-curable elastic ink composition provided by the embodiments of the present disclosure has desired elastic performance, and the elastic performance of the elastic material are closely related to their stretchability and resilience properties. In a linear polymer, a relatively flexible molecular segment (i.e., the soft segment portion) demonstrates more flexibility while a relatively rigid molecular segment (i.e., the hard segment portion) demonstrates more ability to resile. Therefore, the present disclosure selects a soft monomer and a hard monomer, both with high reactivity, as the main components of the ink composition. By adjusting the ratio of the soft and the hard segments, the material can be made to have stretchability and resilience properties as close to the desired properties as possible. Moreover, through "bridging" by the cross-linking agent, the crosslink density of the material may increase, which may finally adjust the resilience properties of the material and improve the mechanical performance of the material. In the meantime, while ensuring the performance of all aspects of the material, a non-reactive resin may be added and the shrinkage ratio of the material may be reduced, such that the printing accuracy may be improved. Finally, the photo-curable elastic material for 3D printing according to the present disclosure can achieve a number of advantages, such as fast curing speed, low shrinkage ratio, high transparency, desired elastic properties, etc. In addition, according to the present disclosure, photo-curable elastic ink compositions with different viscosities can be formulated by adjusting the proportion of each component in the ink composition.

The photo-curable elastic ink composition of the present disclosure is not only suitable for the use in 3D inkjet printing technology, but also can be adapted to photo-curing stereolithography (SLA) technology by adjusting the ratio of the photo-curable elastic ink composition to change the viscosity of the photo-curable elastic ink composition.

The soft monomer and the hard monomer according to the present disclosure are distinguished by the glass transition temperature of the formed homopolymer, and are not related to the molecular weight. When the glass transition temperature of the produced homopolymer is lower than about 25° C., the homopolymer exhibits a viscous flow state at room temperature, and the physical property is soft, so it is called a soft monomer; however, when the glass transition temperature of the polymer is equal to or higher than about 25° C., the homopolymer exhibits a solid state at room temperature, and the physical property is hard, so it is called a hard monomer.

Further, the soft monomer of the present disclosure is preferably a highly reactive monofunctional soft monomer, such as a monomer having a (meth)acryloyloxy group in the molecular structure and capable of forming a homopolymer with a glass transition temperature lower than 0° C. The monofunctional soft monomer may include, for example, one or more selected from the group consisting of alkyl (meth)acrylate, hydroxyalkyl (meth)acrylate, alkoxylated (meth)acrylate, (meth)acrylate having a cyclic structure, and (meth)acrylate containing a urethane group.

For example, the alkyl (meth)acrylate may include one or more selected from the group consisting of isobutyl acrylate, n-octyl acrylate, isooctyl acrylate, isostearyl acrylate, isodecyl acrylate, lauric acid acrylate, isodecyl acrylate, isodecyl methacrylate, stearic methyl acrylate, dodecyl methacrylate, isotridecyl methacrylate, etc. The hydroxyalkyl (meth)acrylate may include one or more selected from the group consisting of 2-hydroxyethyl acrylate, 2-hydroxypropyl acrylate, 4-hydroxybutyl acrylate, etc. The alkoxylation (methyl)acrylate may include one or more selected from the group consisting of 2-methoxyethyl acrylate, ethoxyethoxyethyl acrylate, methoxy polyethylene glycol monoacrylate, methoxy polyethylene glycol methacrylate, etc. The (meth)acrylate having the cyclic structure may include one or more selected from the group consisting of tetrahydrofuran acrylate, 2-phenoxyethyl acrylate, (2-ethyl-2-methyl-1,3-dioxypentyl-4-yl)acrylate, alkoxylated nonylphenol acrylate, ethylated nonylphenol acrylate, etc. The (meth)acrylate containing the urethane group may include one or more selected from the group consisting of urethane acrylate, 2-[[(butylamino)carbonyl]oxy]ethyl acrylate, aliphatic urethane acrylate, etc.

Similarly, the hard monomer of the present disclosure is preferably a highly reactive monofunctional hard monomer, such as a monomer having a (meth)acryloyloxy group in the molecular structure and capable of forming a homopolymer with a glass transition temperature higher than about 25° C. The monofunctional hard monomer may include, for example, one or more selected from the group consisting of cycloalkyl (meth)acrylate, heterocyclic (meth)acrylate, and (meth)acrylate having a benzene ring structure.

For example, the cycloalkyl (meth)acrylate may include one or more selected from the group consisting of isobornyl acrylate, isobornyl methacrylate, 1-adamantyl methacrylate, 3,3,5-trimethylcyclohexane acrylate, and 3,3,5-trimethylcyclohexane methacrylate, etc. The heterocyclic (meth)acrylate may include one or more selected from the group consisting of trimethylolpropane formal acrylate, 3-ethyl-3-epoxypropyl methacrylate, tetrahydrofuran methacrylate, etc. The (meth)acrylate having the benzene ring structure may include one or more selected from the group consisting of 2-phenoxyethyl methacrylate, 2-phenylphenoxyethyl acrylate, etc.

The photo-curable elastic ink composition, i.e., the photo-curable elastic material, of the present disclosure has a fast photo-curing speed, and thus an object printed using the photo-curable elastic ink composition may be elastic. In order to further increase the crosslink density of the elastic material and finally improve the resilience properties and mechanical performance of the elastic material so that the elastic material may be more widely applicable to the printing of various 3D elastic objects, a large number of the cross-linking agents have been tested. According to the present disclosure, when the cross-linking agent includes one or more selected to from bifunctional soft monomers and bifunctional soft resins, the crosslink density of the elastic material can be remarkably increased to finally exhibit desired resilience properties and mechanical performance.

According to the present disclosure, the bifunctional soft monomer is a monomer having two (meth)acryloyloxy groups in the molecular structure and capable of forming a homopolymer with a glass transition temperature lower than about 0° C. For example, the bifunctional soft monomer may include one or more selected from the group consisting of polyethylene glycol (300) diacrylate, polyethylene glycol (400) dimethacrylate, polyethylene glycol (600) diacrylate, polyethylene glycol (600) dimethacrylate, polypropylene glycol (400) diacrylate, polypropylene glycol (750) diacrylate, 1,12-dodecyl dimethacrylate, (10) ethoxylated bisphenol A dimethacrylate, (20) ethoxylated bisphenol A dimethacrylate, (30) ethoxylated bisphenol A dimethacrylate, (ethoxylated)1,6-hexanediol diacrylate, etc.

Further, the bifunctional soft resin is a resin having two (meth)acryloyloxy groups in the molecular structure and capable of forming a polymer with a glass transition temperature lower than about 0° C. The bifunctional soft resin may include one or more selected from the group consisting of urethane acrylate and polybutadiene (meth)acrylate. For example, the urethane acrylate may be an aliphatic urethane acrylate, which demonstrates desired flexibility and extensibility. Currently there are many products available on the market, such as 6113, 6217, 6148T-85, 615-100, 6168, 6152B-80, 6148T-80, etc. of Eternal Material Co., Ltd., CN9021 NS, CN964, CN965 NS, CN980 NS, CN978NS, etc. of Sartomer (now, Arkema), 4256, 4215, 4217, 4230, etc. of Ruiang, CKV-36A, CKV-301, CKV-619X, CKV-153100, etc. of Sapience, and BR-344, BR-345, BR-374, BR-3042, etc. of Bomar.

The polybutadiene (meth)acrylate may be an oligomer formed by introducing a (meth)acrylate group into a polybutadiene. The polybutadiene (meth)acrylate may be formed to have the properties of both elastomer and polyacrylate by ultraviolet (UV) photo-crosslinking. Such an oligomer is liquid at room temperature. Currently, there are many commercially available products, such as CN301, CN302, CN307, CN303, Ricaryl 3801, etc. of Sartomer (now, Arkema), BAC15, BAC45, etc. of Osaka Organic, and BR641, BR643, etc. of Bomar.

Further, the non-reactive soft resin used in the embodiments of the present disclosure is a resin which has a glass transition temperature lower than about 0° C., but does not contain any radiation curable group in the molecular structure. The radiation curable group may refer to one or more of an acryloyl group, a methacryloxy group, a vinyl group, a vinyl ether group, an epoxy group, etc.

The non-reactive soft resin used in the embodiments of the present disclosure is preferably a non-reactive soft resin demonstrating desired compatibility with an acrylic system and having strong intermolecular force. Demonstrating desired compatibility with the acrylic system mainly refers to that the non-reactive soft resin can be completely dissolved in the acrylic system and the solution is clear and transparent. Having strong intermolecular force mainly refers to that, objects printed using an elastic material that is ultimately obtained by adding the corresponding non-reactive soft resin into an ink composition demonstrate desired mechanical performance and small shrinkage. Currently, there are many such products available on the market, such as GENOMER*6043-M22 of Ruiang, PE-1302, PE-5556, PE-9956, PE-12805, PE-2348, etc. of Huafon, and XCP1000M, XCP2000M, XCP3000M, XCP1000N, XCP2000N, XCP3000N, etc. of Xuchuan Chemical.

Further, the photo-initiator may be a free-radical photo-initiator. For example, the free-radical photo-initiator may include one or more selected from the group consisting of benzoin ethyl ether, benzoin α,α-dimethylbenzol ketal, α,α-diethoxyacetophenone, 2-hydroxy-2-methyl-phenylacetone-1,1-hydroxy-cyclohexyl benzophenone, 2-hydroxy-2-methyl-p-hydroxyethyl ether phenylacetone-1, [2-methyl-1-(4-methylthiophenyl)-2-morpholinone-1], [2-benzyl-2-dimethylamino-1-(4-morpholinylphenyl)butanone-1], benzoylformate, 2,4,6-trimethylbenzoyl-ethoxy-phenyl phosphine oxide, 2,4,6-trimethylbenzoyl-diphenyl phosphine oxide, phenylbis(2,4,6-trimethylbenzoyl) phosphine oxide, 4-p-tolylhydrazyl benzophenone, etc.

Further, the auxiliary agent may include one or more selected from the group consisting of leveling agents, defoaming agents, stabilizers, etc.

For example, the leveling agent may be mainly used to improve the fluidity of the ink and the wetting property to the substrate. At the same time, the leveling agent may be able to adjust the surface tension of the ink to allow normal printing. In the present disclosure, as long as the leveling agent adopted can meet the performance requirements described above, the leveling agent is not limited to any specific selections. Currently, there are many commercially available products, such as BYK333, BYK377, BYK1798, BYK-UV3530, BYK-UV3575, BYK-UV3535, etc. of BYK, and TEGO wet 500, TEGO wet 270, TEGO Glide 450, TEGO RAD 2010, TEGO RAD 2011, TEGO RAD 2100, TEGO RAD 2200, etc. of TEGO. The main function of defoaming agent may be to suppress, reduce, and eliminate bubbles in the ink. In the present disclosure, as long as the defoaming agent adopted can achieve the effects described above, the defoaming agent may not be limited to any specific selections. Currently, there are many commercially available products, such as BYK055, BYK088, BYK020, BYK025, etc. of BYK, TEGO Airex 920, TEGO Airex 921, TEGO Airex 986, TEGO Foamex 810, TEGO Foamex N, etc. of TEGO, and Efka 7081, Efka7082, etc. of EFKA. The main function of the stabilizer in the ink composition may be to prevent the polymerization of free radicals in the composition, and to improve the storage stability of the ink composition. The stabilizer may be preferably selected from products that can improve the storage stability and but have no effect on the photo-curing reaction of the ink composition, such as GENORAD*16, GENORAD*18, GENORAD*20, GENORAD*22, etc. of Ruiang, Tinuvin234, Tinuvin770, Irganox245, Cytec S100, Cytec 130, etc. of BASF, and Irgastab UV10, Irgastab UV 22, etc. of Ciba Inc.

It is worth noting that when the above three agents are used at the same time, the leveling agent may account for approximately 0.01% to 3% of the total weight of the ink composition, the defoaming agent may account for approximately 0.01% to 3% of the total weight of the ink composition, and the stabilizer may account for approximately 0.01% to 2% of the total weight of the ink composition.

Further, the component of the ink composition according to the present disclosure may contain a colorant, or may not contain any colorant. When the ink composition does not contain any colorant, the ink composition may be transparent, and the printed object may have a high transparency. When the colorant is contained, the colorant may be a pigment or a dye. According to the present disclosure, the colorant may preferably be a pigment, including one or more selected from the group consisting of C.I.Pigment White 6, C.I.Pigment Red 3, C.I.Pigment Red 5, C.I.Pigment Red 7, C.I.Pigment. Red 9, C.I.Pigment Red 12, C.I.Pigment Red 13, C.I.Pigment Red 21, C.I.Pigment Red 31, C.I.Pigment Red 49:1, C.I.Pigment Red 58:1, C.I.Pigment Red 175; C.I.Pigment Yellow 63, C.I.Pigment Yellow 3, C.I.Pigment Yellow 12, C.I.Pigment Yellow 16, C.I.Pigment Yellow 83; C.I.Pigment Blue 1, C.I.Pigment Blue 10, C.I.Pigment Blue B, Phthalocyanine Blue BX, Phthalocyanine Blue BS, C.I.Pigment Blue 61:1, etc.

The present disclosure also provides a preparation method for the photo-curable elastic ink composition for 3D printing according to the embodiments described above. The photo-curable elastic ink composition may include the following components in a weight percentage: approximately 10%-75% of a soft monomer, approximately 10%-75% of a hard monomer, approximately 5%-20% of a cross-linking agent, approximately 5%-20% of a non-reactive soft resin, approximately 0.5%-10% of a photo-initiator, 0 to approximately 0.5% of a colorant, and approximately 0.05%-8% of an auxiliary agent. Correspondingly, the preparation method for the photo-curable elastic ink composition may include the following exemplary steps.

In step 1, the components described above, except the photo-initiator, may be mixed uniformly to obtain a first mixture, and then the photo-initiator may be added to the first mixture until the photo-initiator is completely dissolved to obtain a second mixture.

In step 2, the second mixture may be filtered, and the filtrate may be collected to obtain the photo-curable elastic ink composition.

The preparation method according to the present disclosure may be completed only by mixing and filtering, and thus may be simple and easy to operate. Therefore, the method is not only beneficial to forming a stable ink composition, but also facilitates liquefaction and spray of the ink, such that the ink may be more convenient to use, and particularly suitable for ink printing of 3D objects.

It should be understood that the preparation of the photo-curable elastic ink composition according to the present disclosure may need to be carried out in an environment outside the triggering wavelength range of the photo-initiator to avoid polymerization of the components of the ink composition due to the light in the environment.

When the photo-curable elastic ink composition according to the present disclosure is used in a 3D inkjet printing process, the filtering process in step 2) may include filtering the second mixture at least twice using a step-by-step filtering method. During the filtering process, the pore diameter of the microporous membrane used in a previous filtering step may be larger than the pore diameter of the microporous membrane used in a following filtering step. In addition, the pore diameter of the microporous membrane used in the last filtering step may be smaller than the pore diameter of the orifice of the printing nozzle during the inkjet printing process. For example, in one embodiment of the present disclosure, the step-by-step filtering method may include two steps of filtering, and during the first step filtering, a glass fiber membrane having a pore diameter of about 0.45 μm may be used, while during the second step filtering, a polypropylene membrane (abbreviated as PP membrane) having a pore diameter of about 0.22 μm may be used.

Further, the method according to the present disclosure also includes performing a degassing treatment process on the collected filtrate. The time for performing the degassing treatment process may be controlled to be not higher than 5 hours. The operation method of the degassing treatment process may be selected from degassing under a vacuum, degassing under the ambient pressure, and degassing while heating. Preferably, the degassing time may be controlled to be in a range of approximately 1 to 3 hours. By degassing the filtrate, the ink composition may demonstrate desired fluidity during use, and may not cause print breakage due to the interference of bubbles in the ink, which may ultimately affect the molding precision of the 3D object.

The photo-curable elastic ink composition for 3D printing according to the present disclosure may demonstrate desired photosensitivity, and fast photo-curing speed, and the printed object may demonstrate desired elasticity, high transparency, and extremely low shrinkage, and thus high-precision printing may be achieved. In the meantime, the viscosity of the photo-curable elastic ink composition may be adjustable. Ink compositions with various viscosities can be obtained by adjusting the proportion of the components in the ink composition. The photo-curable elastic ink composition is not only suitable for 3D inkjet printers that require ink with a low viscosity, but also applicable to SLA 3D printers that require ink with a high viscosity.

In order to make the objects, technical schemes and advantages of the embodiments of the present disclosure clearer, the technical schemes of the embodiments of the present disclosure will be clearly and completely described below with reference to the embodiments of the present disclosure. It is apparent that the embodiments described below are some, rather than all of the embodiments of the present disclosure. All other embodiments obtained by those of ordinary skill in the art based on the embodiments of the present disclosure without creative efforts should be included in the protection scope of the present disclosure.

Embodiment 1

In one embodiment, the photo-curable elastic ink composition for 3D printing includes the following components:

| | |
|---|---|
| 2-methoxyethyl acrylate | 75.0 g |
| 2-phenoxyethyl methacrylate | 13.45 g |
| (30) ethoxylated bisphenol A dimethacrylate | 6.0 g |
| XCP1000M | 5.0 g |
| 2,4,6-trimethylbenzoyl-diphenyl phosphine oxide | 0.5 g |
| Tinuvin770 (stabilizer) | 0.01 g |
| BYK377 (leveling agent) | 0.01 g |
| TEGO Airex 920 (defoaming agent) | 0.03 g |

The photo-curable elastic ink composition for 3D printing may be prepared by a method including the following exemplary steps.

In step 101, about 75.0 g of 2-methoxyethyl acrylate, 13.45 g of 2-phenoxyethyl methacrylate, 6.0 g of (30) ethoxylated bisphenol A dimethacrylate, 5.0 g of XCP1000, 0.01 g of Tinuvin770, 0.01 g of BYK377 and 0.03 g of TEGO Airex 920 may be respectively weighted and then placed into a container. The container may be sealed and the materials may be stirred to obtain a first mixture.

In step 102, about 0.5 g of 2,4,6-trimethylbenzoyl-diphenyl phosphine oxide may then be added into the first mixture and stirred until 2,4,6-trimethylbenzoyl-diphenyl phosphine oxide is completely resolved, such that a second mixture is obtained.

In step 103, the second mixture may be subjected to a first step filtering using a glass fiber membrane with a pore diameter of about 0.45 μm, and then the filtrate obtained after the first step filtering may be subject to a second step filtering using a PP membrane with a pore diameter of about 0.22 μm to obtain the final filtrate.

In step 104, the filtrate may be subject to a pressure-reduced filtration process for about 1 hour in a vacuum environment with a pressure of about 0.1 Mpa to remove the bubbles from the filtrate. As such, the photo-curable elastic ink composition for 3D printing may be obtained.

Further, the performance of the photo-curable elastic ink composition for 3D printing obtained according to the embodiment described may be tested.

For example, a test of the viscosity of the photo-curable elastic ink composition may be performed. For example, the viscosity of the photo-curable elastic ink composition at room temperature may be tested using a DV-I digital viscometer.

Also, a test of the elongation at break and the tensile strength may be performed. For example, the photo-curable elastic ink composition of the present embodiment may be applied to a 3D photo-curable inkjet printer or an SLA 3D printer to print a test object that meets the required size specifications according to GB/T 528-2009, and the elongation at break and the tensile strength of the photo-curable elastic ink composition of the present embodiment may then be tested according to GB/T1040-2006.

Further, a test of the permanent compressive deformation of the photo-curable elastic ink composition may be performed. For example, the photo-curable elastic ink composition of the present embodiment may be applied to a 3D photo-curable inkjet printer or an SLA 3D printer to print a test object that meets the required size specifications according to GB/T 7759.1-2015, and the permanent compressive deformation of the photo-curable elastic ink composition of the present embodiment may then be tested according to GB/T 7759.1-2015.

Further, a test of the hardness of the photo-curable elastic ink composition may be performed. For example, the photo-curable elastic ink composition of the present embodiment may be applied to a 3D photo-curable inkjet printer or an SLA 3D printer to print a test object that meets the required size specifications according to GB/T531.1-2008, and the Shore hardness of the photo-curable elastic ink composition of the present embodiment may then be tested according to GB/T531.1-2008.

Further, a test of the light transmittance of the photo-curable elastic ink composition may be performed. For example, the photo-curable elastic ink composition of the present embodiment may be applied to a 3D photo-curable inkjet printer or an SLA 3D printer to print a squared block with a dimension of approximately 50 mm×50 mm×1 mm, and the light transmittance of the photo-curable elastic ink composition of the present embodiment may then be tested according to GB/T 2410-2008.

Further, a test of the curing time of the photo-curable elastic ink composition may be performed. For example, the photo-curable elastic ink composition of the present embodiment may be used to coat a test sample with a thickness of about 200 μm, and then the test sample may be irradiated with UV light. The moment that the irradiation on the test sample starts may be defined as a starting time, and the moment that the surface of the test sample is completely cured may be defined as the reaction completed time. The time difference between the starting time and the reaction completed time may thus be the time required for completely curing the surface of the test sample. In one embodiment, the light irradiation intensity may be about 20 mW/cm², and when there is no fingerprint left on the surface of the cured film after the test sample is touched by a finger, the surface may be determined as being completely cured.

Further, a test of the shrinkage rate of the photo-curable elastic ink composition may be performed. For example, the photo-curable elastic ink composition of the present embodiment may be applied to a 3D photo-curable inkjet printer or an SLA 3D printer, and the accuracy of the molded product may be tested. The accuracy test may be mainly reflected by the volume shrinkage rate. A pycnometer method may be adopted for the shrinkage rate test. In one embodiment, water may be used as a reference. The density $\rho_1$ of the photosensitive resin prior to curing and the density $\rho_2$ of the photosensitive resin after curing may be measured at about 25° C., and the volume shrinkage rate may then be calculated through the following formula:

$$\text{volume shrinkage rate } \% = \frac{\rho_2 - \rho_1}{\rho_2} \times 100\%.$$

The results obtained through the tests described above is listed in Table 1.

Embodiment 2

In one embodiment, the photo-curable elastic ink composition for 3D printing includes the following components:

| | |
|---|---|
| Isodecyl methacrylate | 10.6 g |
| Tetrahydrofuran methacrylate | 58.0 g |
| CN965 NS | 15.0 g |
| XCP1000M | 13.0 g |
| [2-methyl-1-(4-methylthiophenyl)-2-morpholinone-1] | 1.5 g |
| Irgastab UV 22 (stabilizer) | 0.3 g |
| TEGO Glide 450 (leveling agent) | 0.1 g |
| Efka 7081 (defoaming agent) | 1.5 g |

The photo-curable elastic ink composition for 3D printing may be prepared by a method substantially similar to the method described in Embodiment 1, except that the degassing treatment process may be performed under the ambient pressure for about 3 hours.

The performance test of the photo-curable elastic ink composition for 3D printing of the present embodiment may be carried out in the same manner as described in Embodiment 1. The test results are shown in Table 1.

Embodiment 3

In one embodiment, the photo-curable elastic ink composition for 3D printing includes the following components:

| | |
|---|---|
| N-octyl methacrylate | 47.69 g |
| Isobornyl acrylate | 30.0 g |
| 6113 (8000-12000) of Eternal Material Co., Ltd. | 10.0 g |
| XCP1000M | 10.0 g |
| 1-hydroxy-cyclohexyl benzophenone | 1.0 g |
| 2,4,6-trimethylbenzoyl-diphenyl phosphine oxide | 1.0 g |
| GENORAD*22 (stabilizer) | 0.1 g |
| GENORAD*16 (stabilizer) | 0.1 g |
| TEGO Glide 450 (leveling agent) | 0.05 g |
| TEGO wet 500 (leveling agent) | 0.05 g |
| BYK 088 (defoaming agent) | 0.01 g |

The photo-curable elastic ink composition for 3D printing may be prepared by a method substantially similar to the method described in Embodiment 1, except that the degassing treatment process may be performed using a degassing while heating method. For example, the ink composition may be heated to approximately 40° C. to 60° C. to perform the degassing treatment process for about 1 hour.

The performance test of the photo-curable elastic ink composition for 3D printing of the present embodiment may be carried out in the same manner as described in Embodiment 1. The test results are shown in Table 1.

Embodiment 4

In one embodiment, the photo-curable elastic ink composition for 3D printing includes the following components:

| | |
|---|---|
| (2-ethyl-2-methyl-1,3-dioxypentyl-4-yl)acrylate | 20.45 g |
| Tetrahydrofuran methacrylate | 45.0 g |
| BAC45 | 20.0 g |
| 6043-M22 | 8.0 g |
| [2-methyl-1-(4-methylthiophenyl)-2-morpholinone-1] | 3.0 g |
| Tinuvin770 (stabilizer) | 0.05 g |
| BYK377 (leveling agent) | 1.0 g |
| TEGO wet 500 (leveling agent) | 1.0 g |
| BYK088 (defoaming agent) | 1.0 g |
| Efka 7081 (defoaming agent) | 0.5 g |

The photo-curable elastic ink composition for 3D printing may be prepared by a method substantially similar to the method described in Embodiment 1, except that the time for performing the degassing treatment process under a vacuum may be adjusted to about 2 hours.

The performance test of the photo-curable elastic ink composition for 3D printing of the present embodiment may be carried out in the same manner as described in Embodiment 1. The test results are shown in Table 1.

Embodiment 5

In one embodiment, the photo-curable elastic ink composition for 3D printing includes the following components:

| | |
|---|---|
| Isodecyl methacrylate | 24.0 g |
| 4-hydroxybutyl acrylate | 21.0 g |
| Trimethylolpropane formal acrylate | 15.9 g |
| (20) ethoxylated bisphenol A dimethacrylate | 15.0 g |
| 6043-M22 | 6.0 g |
| 1-hydroxy-cyclohexyl benzophenone | 4.0 g |
| 2,4,6-trimethylbenzoyl-diphenyl phosphine oxide | 6.0 g |
| GENORAD*22 (stabilizer) | 2.0 g |
| BYK377 (leveling agent) | 3.0 g |
| BYK 088 (defoaming agent) | 1.5 g |
| Efka 7081 (defoaming agent) | 1.5 g |
| C.I.Pigment Blue 1 (colorant) | 0.1 g |

The photo-curable elastic ink composition for 3D printing may be prepared by a method substantially similar to the method described in Embodiment 1, except that the degassing treatment process may be performed using a degassing while heating method. For example, the ink composition may be heated to approximately 40° C. to 50° C. to perform the degassing treatment process for about 2 hours.

The performance test of the photo-curable elastic ink composition for 3D printing of the present embodiment may be carried out in the same manner as described in Embodiment 1. The test results are shown in Table 1.

Embodiment 6

In one embodiment, the photo-curable elastic ink composition for 3D printing includes the following components:

| | |
|---|---|
| 2-methoxyethyl acrylate | 50.0 g |
| 2-phenoxyethyl methacrylate | 22.0 g |
| BR-374 | 8.0 g |
| 6043-M22 | 7.0 g |
| 1-hydroxy-cyclohexyl benzophenone | 4.0 g |
| [2-methyl-1-(4-methylthiophenyl)-2-morpholinone-1] | 4.0 g |
| GENORAD*16 (stabilizer) | 1.0 g |
| TEGO Glide 450 (leveling agent) | 1.5 g |
| BYK 088 (defoaming agent) | 2.0 g |
| C.I.Pigment Red 9 (colorant) | 0.5 g |

The photo-curable elastic ink composition for 3D printing may be prepared by a method substantially similar to the method described in Embodiment 1, except that the degassing treatment process may be performed under the ambient pressure for about 2.5 hours.

The performance test of the photo-curable elastic ink composition for 3D printing of the present embodiment may be carried out in the same manner as described in Embodiment 1. The test results are shown in Table 1.

Embodiment 7

In one embodiment, the photo-curable elastic ink composition for 3D printing includes the following components:

| | |
|---|---|
| 4-hydroxybutyl acrylate | 21.7 g |
| Trimethylolpropane formal acrylate | 40.0 g |
| BR-3042 | 15.0 g |
| 6043-M22 | 15.0 g |
| 2,4,6-trimethylbenzoyl-diphenyl phosphine oxide | 2.5 g |
| Irgastab UV 22 (stabilizer) | 0.5 g |
| TEGO wet 500 (leveling agent) | 2.5 g |
| TEGO Airex 920 (defoaming agent) | 0.5 g |
| Efka 7081 (defoaming agent) | 2.0 g |
| C.I.Pigment Yellow 12 (colorant) | 0.5 g |

The photo-curable elastic ink composition for 3D printing may be prepared by a method substantially similar to the method described in Embodiment 1, except that the degassing treatment process may be performed using a degassing while heating method. For example, the ink composition may be heated to approximately 40° C. to 50° C. to perform the degassing treatment process for about 2.5 hours.

The performance test of the photo-curable elastic ink composition for 3D printing of the present embodiment may be carried out in the same manner as described in Embodiment 1. The test results are shown in Table 1.

Embodiment 8

In one embodiment, the photo-curable elastic ink composition for 3D printing includes the following components:

| | |
|---|---|
| 2-methoxyethyl acrylate | 15.0 g |
| 2-[[(butylamino)carbonyl]oxy]ethyl acrylate | 15.0 g |
| Tetrahydrofuran methacrylate | 22.55 g |
| BR-3042 | 19.0 g |
| 6043-M22 | 20.0 g |
| 1-hydroxy-cyclohexyl benzophenone | 2.0 g |
| 2,4,6-trimethylbenzoyl-diphenyl phosphine oxide | 4.0 g |
| GENORAD*16 (stabilizer) | 1.5 g |
| TEGO Glide 450 (leveling agent) | 0.5 g |
| TEGO Airex 920 (defoaming agent) | 0.4 g |
| C.I.Pigment White 6 (colorant) | 0.05 g |

The photo-curable elastic ink composition for 3D printing may be prepared by a method substantially similar to the method described in Embodiment 1, except that the degassing treatment process may be performed under the ambient pressure for about 2.0 hours.

The performance test of the photo-curable elastic ink composition for 3D printing of the present embodiment may be carried out in the same manner as described in Embodiment 1. The test results are shown in Table 1.

Embodiment 9

In one embodiment, the photo-curable elastic ink composition for 3D printing includes the following components:

| | |
|---|---|
| N-octyl acrylate | 11.36 g |
| Isobornyl acrylate | 75.0 g |
| CKV-619X | 5.0 g |
| XCP1000M | 6.0 g |
| [2-methyl-1-(4-methylthiophenyl)-2-morpholinone-1] | 2.0 g |
| GENORAD*22 (stabilizer) | 0.4 g |
| BYK377 (leveling agent) | 0.02 g |
| BYK 088 (defoaming agent) | 0.02 g |
| C.I.Pigment Red 31 (colorant) | 0.1 g |
| C.I.Pigment Blue 10 (colorant) | 0.1 g |

The photo-curable elastic ink composition for 3D printing may be prepared by a method substantially similar to the method described in Embodiment 1, except that the time for performing the degassing treatment process under a vacuum may be adjusted to about 3 hours.

The performance test of the photo-curable elastic ink composition for 3D printing of the present embodiment may be carried out in the same manner as described in Embodiment 1. The test results are shown in Table 1.

COMPARATIVE EXAMPLE

Comparative Example 1

In one comparative example, the photo-curable elastic ink composition for 3D printing includes the following components:

| | |
|---|---|
| 2-methoxyethyl acrylate | 81 g |
| 2-phenoxyethyl methacrylate | 13.45 g |
| XCP1000M | 5.0 g |
| 2,4,6-trimethylbenzoyl-diphenyl phosphine oxide | 0.5 g |
| Tinuvin770 (stabilizer) | 0.01 g |
| BYK377 (leveling agent) | 0.01 g |
| TEGO Airex 920 (defoaming agent) | 0.03 g |

The photo-curable elastic ink composition for 3D printing may be prepared by a method substantially similar to the method described in Embodiment 1.

The performance test of the photo-curable elastic ink composition for 3D printing of the comparative example 1 may be carried out in the same manner as described in Embodiment 1. The test results are shown in Table 2.

Comparative Example 2

In one comparative example, the photo-curable elastic ink composition for 3D printing includes the following components:

| | |
|---|---|
| 4-hydroxybutyl acrylate | 36.7 g |
| Trimethylolpropane formal acrylate | 40.0 g |
| 6043-M22 | 15.0 g |
| 2,4,6-trimethylbenzoyl-diphenyl phosphine oxide | 2.5 g |
| Irgastab UV 22 (stabilizer) | 0.5 g |
| TEGO wet 500 (leveling agent) | 2.5 g |
| TEGO Airex 920 (defoaming agent) | 0.5 g |
| Efka 7081 (defoaming agent) | 2.0 g |
| C.I.Pigment Yellow 12 (colorant) | 0.5 g |

The photo-curable elastic ink composition for 3D printing may be prepared by a method substantially similar to the method described in Embodiment 7.

The performance test of the photo-curable elastic ink composition for 3D printing of the comparative example 2 may be carried out in the same manner as described in Embodiment 1. The test results are shown in Table 2.

Comparative Example 3

In one comparative example, the photo-curable elastic ink composition for 3D printing includes the following components:

| | |
|---|---|
| 2-methoxyethyl acrylate | 80.0 g |
| 2-phenoxyethyl methacrylate | 13.45 g |
| (30) ethoxylated bisphenol A dimethacrylate | 6.0 g |
| 2,4,6-trimethylbenzoyl-diphenyl phosphine oxide | 0.5 g |
| Tinuvin770 (stabilizer) | 0.01 g |
| BYK377 (leveling agent) | 0.01 g |
| TEGO Airex 920 (defoaming agent) | 0.03 g |

The photo-curable elastic ink composition for 3D printing may be prepared by a method substantially similar to the method described in Embodiment 1.

The performance test of the photo-curable elastic ink composition for 3D printing of the comparative example 3 may be carried out in the same manner as described in Embodiment 1. The test results are shown in Table 2.

Comparative Example 4

In one comparative example, the photo-curable elastic ink composition for 3D printing includes the following components:

| | |
|---|---|
| 4-hydroxybutyl acrylate | 36.7 g |
| Trimethylolpropane formal acrylate | 40.0 g |
| BR-3042 | 15.0 g |
| 2,4,6-trimethylbenzoyl-diphenyl phosphine oxide | 2.5 g |
| Irgastab UV 22 (stabilizer) | 0.5 g |
| TEGO wet 500 (leveling agent) | 2.5 g |
| TEGO Airex 920 (defoaming agent) | 0.5 g |
| Efka 7081 (defoaming agent) | 2.0 g |
| C.I.Pigment Yellow 12 (colorant) | 0.5 g |

The photo-curable elastic ink composition for 3D printing may be prepared by a method substantially similar to the method described in Embodiment 7.

The performance test of the photo-curable elastic ink composition for 3D printing of the comparative example 4 may be carried out in the same manner as described in Embodiment 1. The test results are shown in Table 2.

TABLE 1

Performance parameters of the photo-curable elastic ink composition for 3D printing measured for the embodiments described in the present disclosure

| Performance Parameter | Embodiment | | | | | | | | |
|---|---|---|---|---|---|---|---|---|---|
| | 1 | 2 | 3 | 4 | 5 | 6 | 7 | 8 | 9 |
| Viscosity at 25° C. (mPa · s) | 15.8 | 38.0 | 25.6 | 80.3 | 51.7 | 203.1 | 520.3 | 850.0 | 20.0 |
| Elongation at break (%) | 801 | 390 | 632 | 785 | 805 | 420 | 670 | 978 | 542 |
| Tensile strength (MPa) | 0.15 | 0.82 | 0.32 | 0.24 | 0.70 | 0.55 | 0.85 | 1.21 | 0.40 |
| Permanent compressive deformation (%) | 1.0 | 0.2 | 1.2 | 0.3 | 1.5 | 0.2 | 0.3 | 1.2 | 0.8 |
| Hardness (Shore A) | 20 | 45 | 27 | 25 | 40 | 34 | 48 | 55 | 30 |
| Transmittance (%) | 94.0 | 93.4 | 92.1 | 93.8 | — | — | — | — | — |
| Curing time (S) | 2 | 2 | 1 | <1 | <1 | <1 | 1 | <1 | <1 |
| Shrinkage rate (%) | 4.12 | 4.30 | 4.23 | 3.67 | 3.89 | 3.51 | 3.34 | 3.05 | 4.25 |

TABLE 2

Performance parameters of the photo-curable elastic ink composition for 3D printing measured for the comparative example described in the present disclosure

| Performance Parameter | comparative example | | | |
|---|---|---|---|---|
| | 1 | 2 | 3 | 4 |
| Viscosity at 25° C. (mPa · s) | 4.8 | 24.5 | 4.3 | 90.2 |
| Elongation at break (%) | 780 | 660 | 770 | 600 |
| Tensile strength (MPa) | 0.05 | 0.34 | 0.14 | 0.75 |
| Permanent compressive deformation (%) | 6.0 | 5.2 | 1.1 | 4.8 |
| Hardness (Shore A) | 8 | 40 | 21 | 50 |
| Transmittance (%) | 92.0 | — | 94.0 | — |
| Curing time (S) | 20 | 9 | 2 | 1 |
| Shrinkage rate (%) | 4.32 | 3.51 | 5.2 | 5.8 |

According to the results shown in Table 1 and Table 2, the disclosed photo-curable elastic ink composition for 3D printing may demonstrate the following advantages.

For example, the photo-curable elastic ink composition for 3D printing according to the present disclosure has an elongation at break in a range of approximately 390% to 978% (higher than that of conventional acrylate elastomers, that is, the ink composition according to the present disclosure is easily elongated but is not easily broken), a tensile strength in a range of approximately 0.15 MPa to 1.21 MPa (less than that of conventional acrylate elastomers, that is, the ink composition according to the present disclosure is easily stretched), and a hardness in a range of approximately 20 Shore A to 40 Shore A, indicating that the photo-curable elastic ink composition for 3D printing according to the present disclosure demonstrates desired stretchability. Further, the permanent compressive deformation of the photo-curable elastic ink composition for 3D printing according to the present disclosure is less than about 15% at 25° C., indicating that the disclosed ink composition has low permanent compressive deformation, and thus demonstrates desired resilience properties. Therefore, the photo-curable elastic ink composition for 3D printing according to the present disclosure has desired stretchability and resilience properties, and thus is able to print products that have advanced elastic properties.

Also, the photo-curable elastic ink composition for 3D printing according to the present disclosure has a wide viscosity distribution at normal temperature, and thus can be applied to a 3D inkjet printer that requires ink with a lower viscosity, and to an SLA 3D printer that requires ink with a higher viscosity.

Further, the photo-curable elastic ink composition for 3D printing according to the present disclosure can have a suitable viscosity at room temperature, so that it is possible to effectively extend the life of the print head without using a high-temperature-resistant print head.

Further, the photo-curable elastic ink composition for 3D printing according to the present disclosure has desired photosensitivity, and the curing time is less than or equal to about 2 seconds at a light irradiation intensity of about 20 mW/cm$^2$. Therefore, the photo-curing speed is fast.

Further, the photo-curable elastic ink composition for 3D printing according to the present disclosure has a light transmittance of about 91% or higher, such that the ink composition can be used to print an object that has high transparency.

Further, because the photo-curable elastic ink composition for 3D printing according to the present disclosure has a low shrinkage ratio, a 3D object formed using the ink composition may overall has a low shrinkage rate, and thus warping deformation can be avoided.

Further, the photo-curable elastic ink composition containing the cross-linking agent for 3D printing according to the present disclosure has improved the recovery performance of the material and improve mechanical properties of the material.

Further, the photo-curable elastic ink composition containing the non-reactive soft resin for 3D printing according to the present disclosure has desired mechanical performance and small shrinkage.

Further, it should be noted that the above embodiments are merely illustrative of the technical solutions of the present disclosure, and are not intended to limit the scope of the present disclosure; although the present disclosure has been described in detail with reference to the above embodiments, those of ordinary skill in the art should understand that the technical solutions described in the above embodiments may be modified, or some or all of the technical features may be equivalently replaced; and the modifications or replacements do not deviate from the range of the technical solutions of the embodiments of the present disclosure. Any modifications, equivalents, improvements, etc., that are within the spirit and scope of the present disclosure, shall be included in the scope of protection of the present disclosure.

What is claimed is:

1. A photo-curable elastic ink composition for 3D printing, comprising:
approximately 10%-75% of a soft monomer; approximately 10%-75% of a hard monomer; approxi- 5%-20% of a cross-linking agent; approximately 5%-20% of a non-reactive soft resin approximately 0.5%-10% of a photo-initiator; 0% to approximately 0.5% of a colorant; and approximately 0.05%-8% of an auxiliary agent, by weight, wherein:
the soft monomer is a monomer capable of forming a homopolymer having a glass transition temperature lower than about 25° C.,
the hard monomer is a capable of forming a homopolymer having a glass transition temperature higher than or equal to about 25° C.,
the cross-linking agent includes one or more selected from the group consisting of bifunctional soft monomers and bifunctional soft resins, wherein a bifunctional soft monomer is a monomer having two (meth)acryloyloxy groups in a molecular structure and capable of forming a homopolymer with a glass transition temperature lower than about 0° C., and a bifunctional soft resin is a resin having two (meth) acryloyloxy groups in a molecular structure and capable of forming a polymer with a glass transition temperature lower than 0° C., and
the non-reactive soft resin is a resin having a glass transition temperature less than 0° C. and a molecular structure without containing any radiation curable group.

2. The ink composition according to claim 1, wherein the soft monomer is a monofunctional soft monomer.

3. The ink composition according to claim 2, wherein the monofunctional soft monomer is a monomer having a (meth)acryloyloxy group in a molecular structure and capable of forming a homopolymer with a glass transition temperature lower than about 0° C.

4. The ink composition according to claim 3, wherein:
the monofunctional soft monomer includes one or more selected from the group consisting of alkyl (meth) acrylate, hydroxyalkyl (meth)acrylate, alkoxylated (meth)acrylate, (meth)acrylate having a cyclic structure, and (meth)acrylate containing a urethane group; and
the monofunctional hard monomer includes one or more selected from the group consisting of cycloalkyl (meth) acrylate, heterocyclic (meth)acrylate, and (meth)acrylate having a benzene ring structure.

5. The ink composition according to claim 4, wherein:
the alkyl (meth)acrylate includes one or more selected from the group consisting of isobutyl acrylate, n-octyl acrylate, isooctyl acrylate, isostearyl acrylate, isodecyl acrylate, lauric acid acrylate, isodecyl acrylate, isodecyl methacrylate, stearic methyl acrylate, dodecyl methacrylate, and isotridecyl methacrylate;
the hydroxyalkyl (meth)acrylate includes one or more selected from the group consisting of 2-hydroxyethyl acrylate, 2-hydroxypropyl acrylate, and 4-hydroxybutyl acrylate;
the alkoxylation (methyl)acrylate includes one or more selected from the group consisting of 2-methoxyethyl acrylate, ethoxyethoxyethyl acrylate, methoxy polyethylene glycol monoacrylate, and methoxy polyethylene glycol methacrylate;
the (meth)acrylate having the cyclic structure includes one or more selected from the group consisting of tetrahydrofuran acrylate, 2-phenoxyethyl acrylate, (2-ethyl-2-methyl-1,3-dioxypentyl-4-yl)acrylate, alkoxylated nonylphenol acrylate, and ethylated nonylphenol acrylate; the (meth)acrylate containing the urethane group includes one or more selected from the group consisting of urethane acrylate, 2-[[(butylamino) carbonyl]oxy]ethyl acrylate, and aliphatic urethane acrylate;
the cycloalkyl (meth)acrylate includes one or more selected from the group consisting of isobornyl acrylate, isobornyl methacrylate, 1-adamantyl methacrylate, 3,3,5-trimethylcyclohexane acrylate, and 3,3,5-trimethylcyclohexane methacrylate;
the heterocyclic (meth)acrylate includes one or more selected from the group consisting of trimethylolpropane formal acrylate, 3-ethyl-3-epoxypropyl methacrylate, and tetrahydrofuran methacrylate; and
the (meth)acrylate having the benzene ring structure includes one or more selected from the group consisting of 2-phenoxyethyl methacrylate, and 2-phenylphenoxyethyl acrylate.

6. The ink composition according to claim 1, wherein:
the bifunctional soft monomer includes one or more selected from the group consisting of polyethylene glycol (300) diacrylate, polyethylene glycol (400) dimethacrylate, polyethylene glycol (600) diacrylate, polyethylene glycol (600) dimethacrylate, polypropylene glycol (400) diacrylate, polypropylene glycol (750) diacrylate, 1,12-dodecyl dimethacrylate, (10) ethoxylated bisphenol A dimethacrylate, (20) ethoxylated bisphenol A dimethacrylate, (30) ethoxylated bisphenol A dimethacrylate, and (ethoxylated)1,6-hexanediol diacrylate; and
the bifunctional soft resin includes one or more selected from the group consisting of urethane acrylate and polybutadiene (meth)acrylate.

7. The ink composition according to claim 1, wherein:
the radiation curable group include one or more of an acryloyl group, a methacryloxy group, a vinyl group, a vinyl ether group, and an epoxy group.

8. The ink composition according to claim 1, wherein:
the photo-initiator is a free-radical photo-initiator.

9. The ink composition according to claim 1, wherein:
the auxiliary agent includes one or more selected from leveling agents, defoaming agents, and stabilizers.

10. The ink composition according to claim 9, wherein:
the auxiliary agent includes a leveling agent, a defoaming agent, and a stabilizer, wherein the leveling agent accounts for approximately 0.01% to 3% of a total weight of the ink composition, the defoaming agent accounts for approximately 0.01% to 3% of the total weight of the ink composition, and the stabilizer accounts for approximately 0.01% to 2% of the total weight of the ink composition.

11. The ink composition according to claim 1, wherein:
the colorant is a pigment or a dye.

12. The ink composition according to claim 1, wherein the photo-curable elastic ink composition is of a particle size no greater than about 0.22 micrometers (μm) so that the photo-curable elastic ink composition passes through a polypropylene membrane having a pore diameter of about 0.22 μm.

13. The ink composition according to claim 1, wherein a cured form of the ink composition is of a light transmittance of about 91% or higher, and the light transmittance is tested according to GB/T 2410-2008.

14. The ink composition according to claim 1, wherein a cured form of the ink composition is of an elongation at break in a range of about 390% to 978%, and the elongation at break is tested according to GB/T 1040-2006.

15. The ink composition according to claim 1, wherein a cured form of the ink composition is of a tensile strength in a range of about 0.15 MPa to 1.21 MPa, and the tensile strength is tested according to GB/T 1040-2006.

16. The ink composition according to claim 1, wherein the hard monomer is a monomer having a (meth)acryloyloxy group in a molecular structure.

\* \* \* \* \*